(12) United States Patent
Hayashi

(10) Patent No.: US 12,461,052 B2
(45) Date of Patent: Nov. 4, 2025

(54) SENSOR

(71) Applicant: KABUSHIKI KAISHA TOSHIBA, Tokyo (JP)

(72) Inventor: Yumi Hayashi, Ayase Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 278 days.

(21) Appl. No.: 18/159,877

(22) Filed: Jan. 26, 2023

(65) Prior Publication Data

US 2023/0408434 A1    Dec. 21, 2023

(30) Foreign Application Priority Data

Jun. 8, 2022    (JP) .................. 2022-092774
Aug. 31, 2022    (JP) .................. 2022-138529

(51) Int. Cl.
*G01N 27/22* (2006.01)
*G01N 33/00* (2006.01)

(52) U.S. Cl.
CPC ......... *G01N 27/22* (2013.01); *G01N 33/0027* (2013.01)

(58) Field of Classification Search
CPC .............................. G01N 27/22; G01N 27/227
See application file for complete search history.

(56) References Cited

U.S. PATENT DOCUMENTS

| 2019/0086377 | A1  | 3/2019 | Ikehashi et al. |
| 2019/0162694 | A1* | 5/2019 | Hayashi ............. G01N 27/4074 |
| 2020/0080954 | A1* | 3/2020 | Yamazaki ............ G01N 27/123 |
| 2020/0300803 | A1* | 9/2020 | Hayashi .............. G01N 27/226 |

FOREIGN PATENT DOCUMENTS

| JP | 2019-56607 A    | 4/2019 |
| JP | 2019-100705 A   | 6/2019 |
| JP | 6829181 B2      | 2/2021 |
| WO | WO 2009/126568 A1 | 10/2009 |

* cited by examiner

*Primary Examiner* — Erika J. Villaluna
(74) *Attorney, Agent, or Firm* — Finnegan, Henderson, Farabow, Garrett & Dunner, LLP

(57) ABSTRACT

According to one embodiment, a sensor includes a structure. The structure includes a first layer, a first film including a first film region, and a first intermediate layer including a first partial region. The first partial region is between the first layer and the first film region. A volume of the first layer is changeable depending on a detection target around the structure. The first film includes silicon and oxygen. The first intermediate layer includes at least one selected from the group consisting of Pd, Pt and Ti.

19 Claims, 13 Drawing Sheets

SENSOR

CROSS-REFERENCE TO RELATED APPLICATIONS

This application is based upon and claims the benefit of priority from Japanese Patent Application No. 2022-092774, filed on Jun. 8, 2022, and Japanese Patent Application No. 2022-138529, filed on Aug. 31, 2022; the entire contents of which are incorporated herein by reference.

FIELD

Embodiments described herein relate generally to a sensor.

BACKGROUND

For example, stable detection is desired for a sensor.

DETAILED DESCRIPTION

Figure 1:
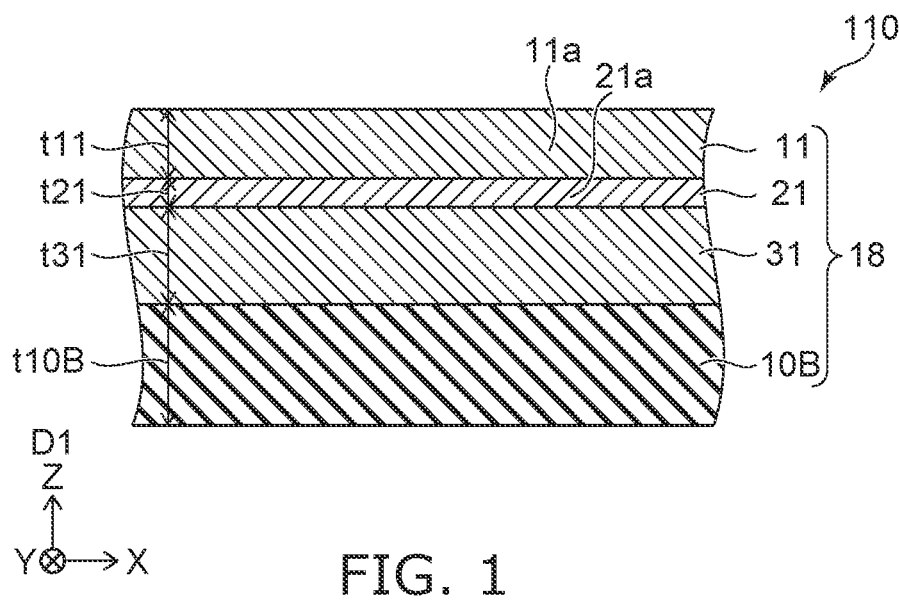
FIG. 1 is a schematic view illustrating a sensor according to a first embodiment.

According to one embodiment, a sensor includes a structure. The structure includes a first layer, a first film including a first film region, and a first intermediate layer including a first partial region. The first partial region is between the first layer and the first film region. A volume of the first layer is changeable depending on a detection target around the structure. The first film includes silicon and oxygen. The first intermediate layer includes at least one selected from the group consisting of Pd, Pt and Ti.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic view illustrating a sensor according to a first embodiment.

As shown in FIG. 1, a sensor 110 according to the embodiment includes a structure 18. The structure 18 includes first layer 31, a first film 11 and a first intermediate layer 21. The first film 11 includes a first film region 11a. The first intermediate layer 21 includes a first partial region 21a. The structure 18 is, for example, a detector.

The first partial region 21a is between the first layer 31 and the first film region 11a. A direction from the first layer 31 to the first film region 11a is defined as a first direction D1. The first direction D1 is defined as a Z-axis direction. One direction perpendicular to the Z-axis direction is defined as an X-axis direction. A direction perpendicular to the Z-axis direction and the X-axis direction is defined as a Y-axis direction.

The first layer 31 is along an X-Y plane. The first layer 31 may be substantially parallel to the X-Y plane.

The volume of the first layer 31 can change depending on a detection target around the structure 18. For example, the detection target is gas. The detection target is, for example, hydrogen. The detection target may include at least one selected from the group consisting of hydrogen, hydrogen molecules, and hydrogen ions. An electrical resistance of the first layer 31 may be changeable depending on the detection target around the structure 18.

For example, the first layer 31 can incorporate the detection target (e.g., hydrogen). For example, the volume of the first layer 31 increases as the detection target is taken into the first layer 31. The change in volume may cause the structure 18 to deform. For example, by detecting deformation, a concentration of the detection target can be detected.

An electrical resistivity of the first layer 31 changes (for example, increases) by taking the detection target into the first layer 31. This changes the electrical resistance of the first layer 31. By detecting the change in the electrical resistance, the concentration of the detection target can be detected.

In the embodiment, the first film 11 includes silicon and oxygen. The first film 11 includes, for example, $SiO_x$ ($1 \leq x \leq 2$). The first film 11 includes $SiO_2$, for example. For example, the first film 11 allows the detection target to permeate. The first film 11 is difficult to permeate a substance (for example, oxygen) that is different from the detection target. For example, the hydrogen permeability of the first film 11 is higher than the oxygen permeability of the first film 11. Permeation of oxygen is suppressed by the first film 11. By providing the first film 11, the influence of the substance different from the detection target can be suppressed. The detection target can be detected with high sensitivity. The first film 11 may include oxygen and at least one selected from the group consisting of silicon and aluminum. The first film 11 may include, for example, aluminum and oxygen. The first film 11 may include, for example, aluminum oxide.

In the embodiment, the first intermediate layer 21 includes at least one selected from the group consisting of Pd, Pt and Ti. For example, the structure of the first layer 31 may change due to the influence of substances different from the detection target (for example, water). For example, amorphousness or crystallinity of the first layer 31 may change due to the influence of water or the like existing around the structure 18. For example, the properties of the first layer 31 change due to the influence of water or the like. As a result, the degree of change in the characteristics of the detection target changes. Stable detection becomes difficult.

In the embodiment, the provision of the first intermediate layer 21 suppresses a change in properties due to the substance (for example, water) that is different from the detection target. For example, the first intermediate layer 21 has a low transmittance to the substance (such as water) that is different from the detection target. Substances other than the detection target (for example, water) do not substantially permeate the first intermediate layer 21. This makes it possible to suppress the influence of the substance (for example, water) that is different from the detection target. According to the embodiment, more stable detection becomes possible.

According to the embodiment, it is possible to suppress the influence of substances different from the detection target (for example, oxygen or water). According to the embodiment, a sensor capable of stable detection can be provided.

In the embodiment, the first layer 31 includes Pd, Cu and Si. This makes it easy to obtain a large volume change when hydrogen is the detection target. A large resistance change is likely to be obtained when hydrogen is to be detected. Hydrogen can be detected with high sensitivity. The first layer 31 includes, for example, an alloy including Pd, Cu and Si. For example, the catalytic action of the first intermediate layer 21 efficiently converts hydrogen molecules into hydrogen atoms. As a result, the change (volume or electrical resistance change) of the first layer 31 due to hydrogen occurs more effectively.

In the embodiment, at least a part of the first layer 31 is preferably amorphous. Thereby, a signal obtained from the structure 18 (for example, the detector) responds to hydrogen at high speed. Hysteresis can be suppressed in hydrogen absorption and hydrogen release.

An example of characteristics when the detection target is hydrogen will be described below.

Figure 2:
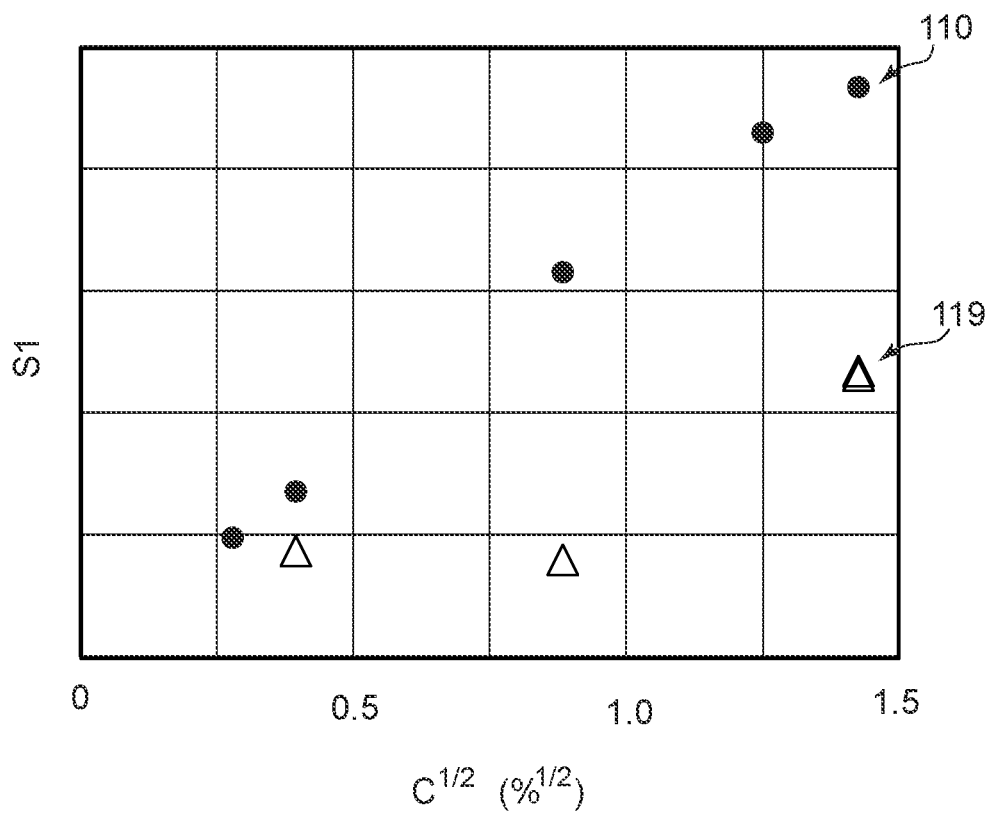
FIG. 2 is a graph illustrating the characteristics of the sensor.

FIG. 2 is a graph illustrating the characteristics of the sensor.

The concentration of the detection target (hydrogen) in the atmosphere around the structure 18 is defined as a concentration C. The horizontal axis of FIG. 2 is $C^{1/2}$. The vertical axis is the detection sensitivity S1 (relative value). FIG. 2 illustrates the characteristics of the sensor 110 according to the embodiment. The figure illustrates characteristics of a sensor 119 of a first reference example. In the sensor 110, the structure 18 includes the first layer 31, the first film 11 and the first intermediate layer 21, as described above. In the sensor 119, the structure 18 includes the first layer 31 and does not include the first film 11 and the first intermediate layer 21. In FIG. 2, the atmosphere around the structure 18 is air, including oxygen and hydrogen.

In this example, the first layer 31 includes an alloy including Pd, Cu and Si. The first intermediate layer 21 includes Pt. The first film 11 includes $SiO_x$ ($1 \leq x \leq 2$).

As shown in FIG. 2, in the sensor 110, the sensitivity S1 changes with high linearity over a wide range of changes in the concentration $C^{1/2}$.

On the other hand, in the sensor 119, the sensitivity S1 is low in the region where the concentration $C^{1/2}$ is low. The linearity is low.

In the sensor 119 of the first reference example, oxygen included in the atmosphere (air) reaches the first layer 31. Oxygen reaching the first layer 31 reacts with hydrogen dissociated on the surface of the first layer 31 and dissipates into the atmosphere. As a result, hydrogen attached to or taken into the first layer 31 is released from the first layer 31. This is considered to make it difficult to obtain a high sensitivity S1.

In contrast, in the sensor 110 according to the embodiment, oxygen in the atmosphere is prevented from reaching the first layer 31 by providing the first film 11. For example, the first film 11 blocks oxygen. High sensitivity is obtained by suppressing the influence of oxygen. High linearity is obtained.

Figure 3A:
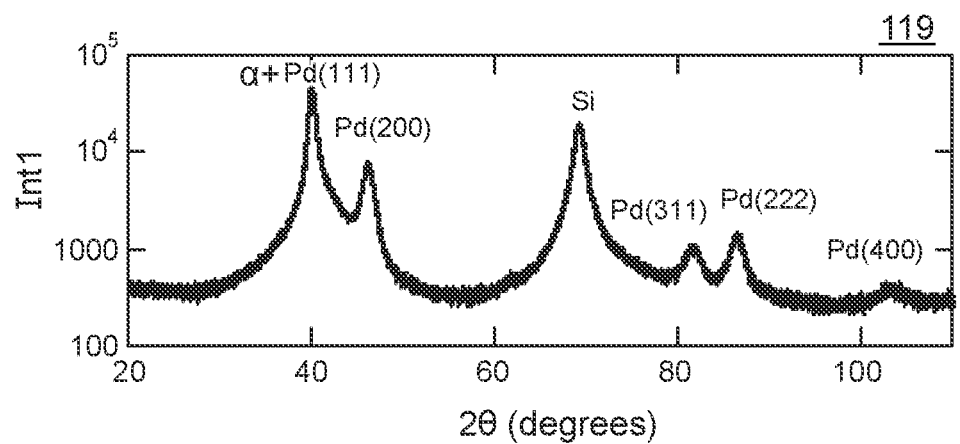
FIGS. 3A to 3C are graphs illustrating the characteristics of the sensor.
Figure 3B:
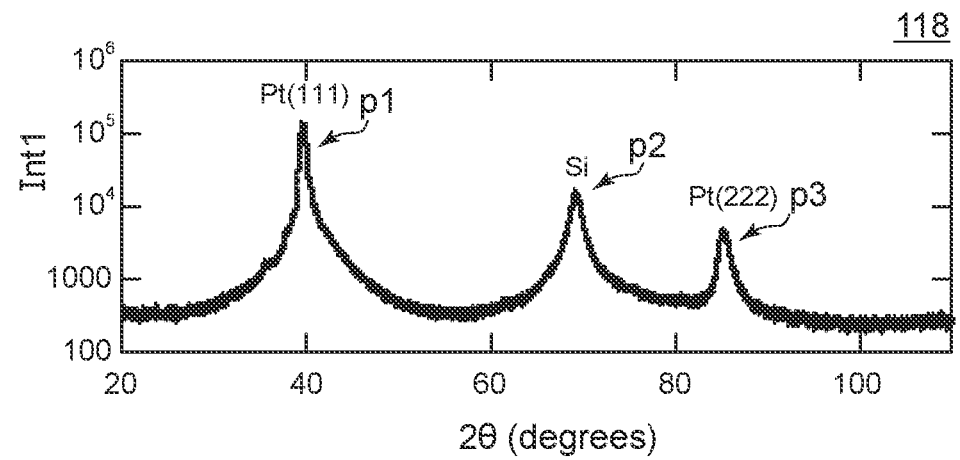
Figure 3C:
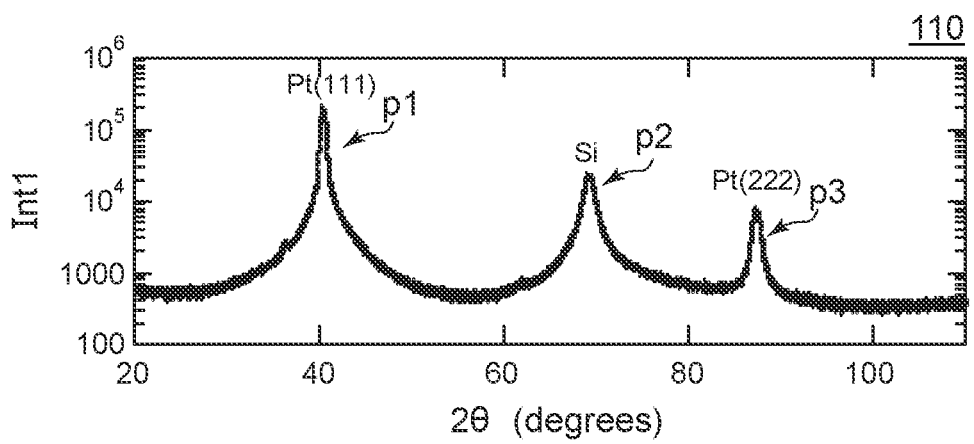

FIGS. 3A to 3C are graphs illustrating the characteristics of the sensor.

FIG. 3A corresponds to the sensor 119 of the first reference example. FIG. 3B corresponds to a sensor 118 of a second reference example. FIG. 3C corresponds to the sensor 110 according to the embodiment. In the sensor 118, the structure 18 includes the first layer 31 and the first intermediate layer 21 and does not include the first film 11.

These figures illustrate the results of XRD (X-ray Diffraction) analysis. The horizontal axis of these figures is an angle 2θ. The vertical axis is a signal intensity Int1. These figures illustrate properties of the samples after high temperature testing. Before the high temperature test, the first layer 31 is amorphous. The condition of the high temperature test in FIG. 3A is 300° C. for 1 hour. The condition of the high temperature test in FIG. 3B is 300° C. for 1 hour. The condition of the high temperature test in FIG. 3C is 300° C. for 15 hours.

As shown in FIGS. 3B and 3C, in the sensors 118 and 110, a first peak p1, a second peak p2 and a third peak p3 are observed. At the first peak p1, the angle 2θ is about 40 degrees (not less than 38 degrees and not more than 42 degrees). The first peak p1 corresponds to Pt(111) and amorphous layers. At the second peak p2, the angle 2θ is approximately 69 degrees (not less than 67 degrees and not more than 71 degrees). The second peak p2 corresponds to Si. At the third peak p3, the angle 2θ is about 86 degrees (not less than 84 degrees and not more than 88 degrees). The third peak p3 corresponds to Pt(222).

On the other hand, as shown in FIG. 3A, in the sensor 119, peaks different from the first to third peaks p1 to p3 are observed. In the sensor 119, it is believed that the structure of the first layer 31 changed during the high temperature test. For example, regarding Pd included in the first layer 31, peaks of Pd(111), Pd(311), Pd(222) and Pd(400) are observed. The structure of the first layer 31 changes due to the effects of oxygen and water in the high temperature test.

When the structure changes, the characteristics of the volume change or resistance change based on the detection target in the first layer 31 change. This makes stable detection difficult.

Substantially no structural change is observed in the sensor 118 and the sensor 110 after the high temperature test. It is considered that the influence of water can be suppressed by the first intermediate layer 21 and the first film 11.

In the embodiment, a thickness of the first layer 31 along the first direction D1 is defined as a thickness t31. In the embodiment, the thickness t31 is preferably not less than 10 nm and not more than 10 μm, for example.

In the embodiment, a thickness along the first direction D1 of the first partial region 21a is defined as a thickness t21. In the embodiment, the thickness t21 is preferably not less than 1 nm and not more than 1000 nm, for example.

In the embodiment, a thickness along the first direction D1 of the first film region 11a is defined as a thickness t11. In the embodiment, the thickness t11 is preferably not less than 1 nm and not more than 1000 nm, for example.

As shown in FIG. 1, the structure 18 may further include a base layer 10B. There is the first layer 31 between the base layer 10B and the first film region 11a. The base layer 10B includes at least one selected from the group consisting of silicon, aluminum and titanium and at least one selected from the group consisting of oxygen and nitrogen. In one example, the base layer 10B includes at least one selected from the group consisting of silicon nitride and silicon oxide. The base layer 10B may include at least one selected from the group consisting of aluminum oxide and titanium nitride. The base layer 10B with stable characteristics is obtained.

For example, stress is generated between the base layer and the first layer 31 based on the volume change of the first layer 31. This facilitates deformation of the structure 18. By detecting the deformation, the detection target can be detected with high sensitivity. Deformation detection may be performed, for example, by detecting electrical properties. Deformation detection may be detected optically.

In the embodiment, a thickness along the first direction D1 of the base layer 10B is defined as a thickness t10B. In the embodiment, the thickness t10B is preferably not less than 10 nm and not more than 100 μm, for example.

Figure 4:
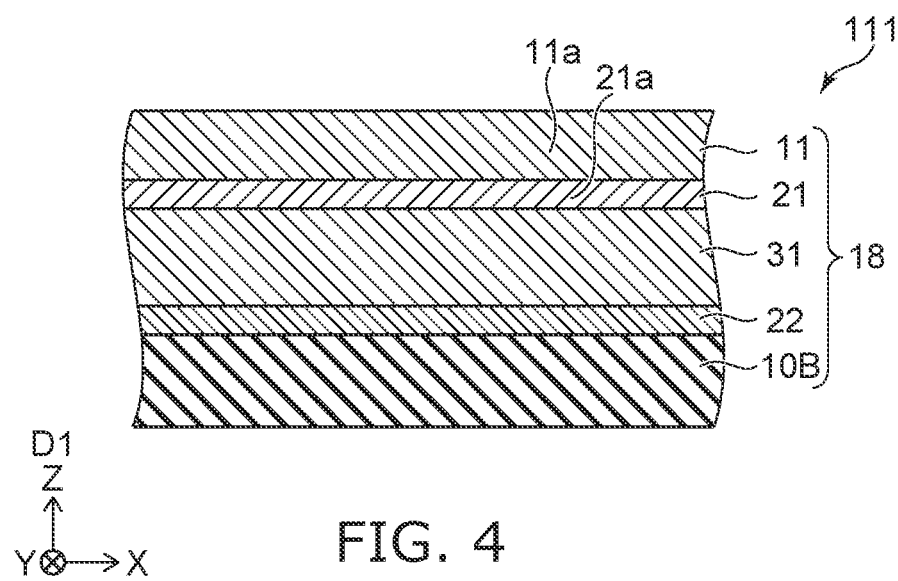
FIG. 4 is a schematic cross-sectional view illustrating a sensor according to the first embodiment.

FIG. 4 is a schematic cross-sectional view illustrating a sensor according to the first embodiment.

As shown in FIG. 4, in a sensor 111 according to the embodiment, the structure 18 further includes a second intermediate layer 22. Except for this, the configuration of the sensor 111 may be the same as that of the sensor 110.

The second intermediate layer 22 is between the base layer 10B and the first layer 31. The second intermediate layer 22 includes Ti. The second intermediate layer 22 may include at least one selected from the group consisting of Pd, Pt and Ti. By providing the second intermediate layer 22, the first layer 31 can be fixed to the base layer 10B with high adhesion. For example, peeling can be suppressed.

Figure 5A:
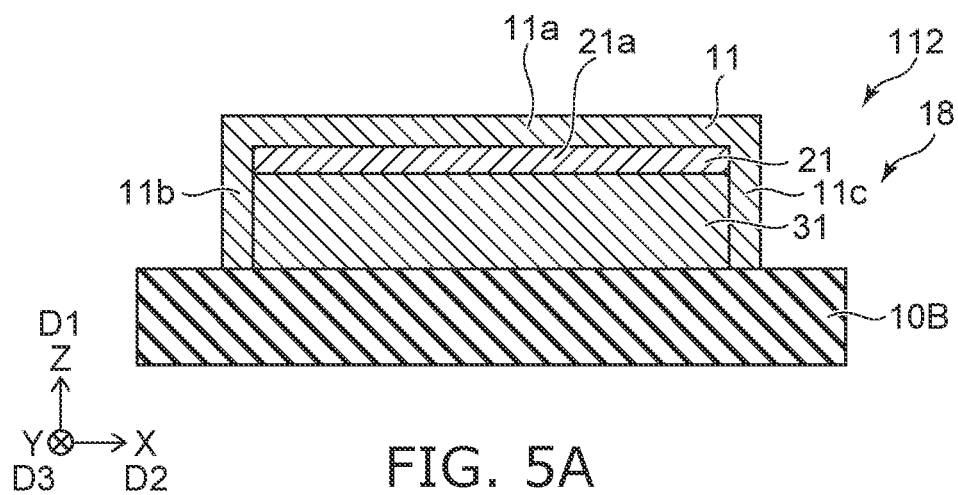
FIGS. 5A and 5B are schematic cross-sectional views illustrating a sensor according to the first embodiment.
Figure 5B:
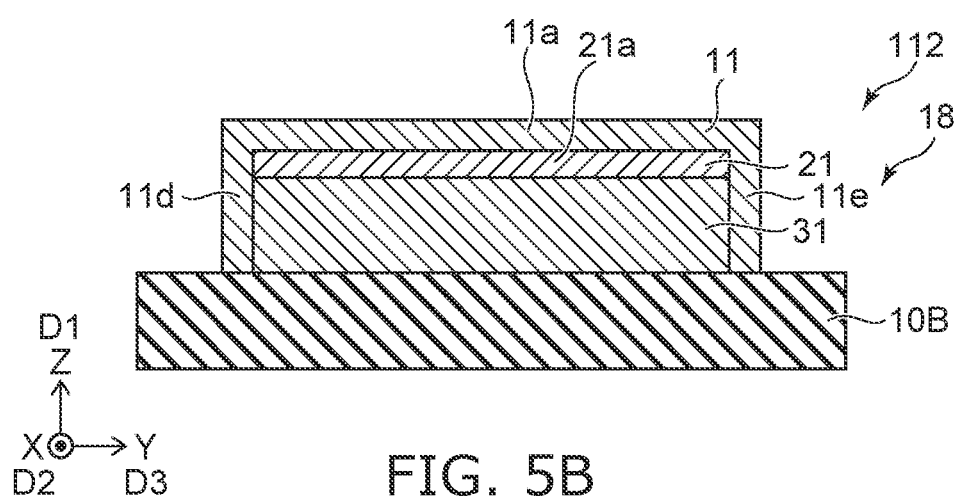

FIGS. 5A and 5B are schematic cross-sectional views illustrating a sensor according to the first embodiment.

As shown in FIG. 5A, in a sensor 112 according to the embodiment, the first film 11 further includes a second film region 11b and a third film region 11c. Except for this, the configuration of the sensor 112 may be the same as that of the sensor 110.

In a second direction D2 crossing the first direction D1 from the first layer 31 to the first film region 11a, the first layer 31 is between the second film region 11b and the third film region 11c. The second direction D2 is, for example, the X-axis direction. The second direction D2 may be, for example, the Y-axis direction. In the sensor 112, the first layer 31 may be provided between portions of the first film 11 in two directions crossing the first direction D1. For example, the first film 11 covers the first layer 31.

In the sensor 112, the influence of oxygen on the side surface of the first layer 31 can be effectively suppressed by the second film region 11b and the third film region 11c. More stable detection becomes possible. Higher sensitivity is obtained.

For example, the first film region 11a is continuous with the second film region 11b and the third film region 11c. For example, the second film region 11b and the third film region 11c are in contact with the base layer 10B.

As shown in FIG. 5B, in the sensor 112 according to the embodiment, the first film 11 may further include a fourth film region 11d and a fifth film region 11e.

In a third direction D3, the first layer 31 is between the fourth film region 11d and the fifth film region 11e. The third direction D3 crosses a plane including the first direction D1 and the second direction D2. The third direction D3 is, for example, the Y-axis direction. For example, the first film 11 covers the first layer 31.

For example, the first film region 11a is continuous with the fourth film region 11d and the fifth film region 11e. The second film region 11b is continuous with the fourth film region 11d and the fifth film region 11e. The third film region 11c is continuous with the fourth film region 11d and the fifth film region 11e. For example, the fourth film region 11d and the fifth film region 11e are in contact with the base layer 10B.

FIGS. 6A to 6C, and FIGS. 7A to 7C are schematic cross-sectional views illustrating a method for manufacturing the sensor according to the first embodiment.

Figure 6A:
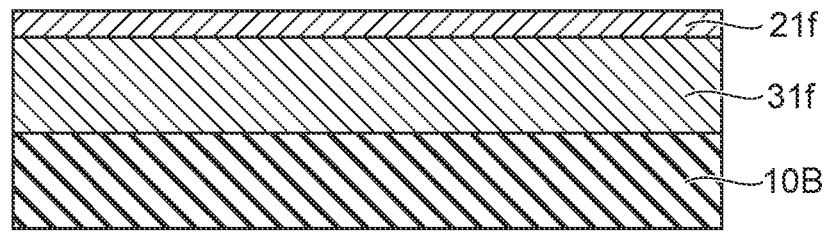
FIGS. 6A to 6C are schematic cross-sectional views illustrating a method for manufacturing the sensor according to the first embodiment.

As shown in FIG. 6A, a film 31f to be the first layer 31 and a film 21f to be the first intermediate layer 21 are formed on the base layer 10B. These films are formed by sputtering, for example.

Figure 6B:
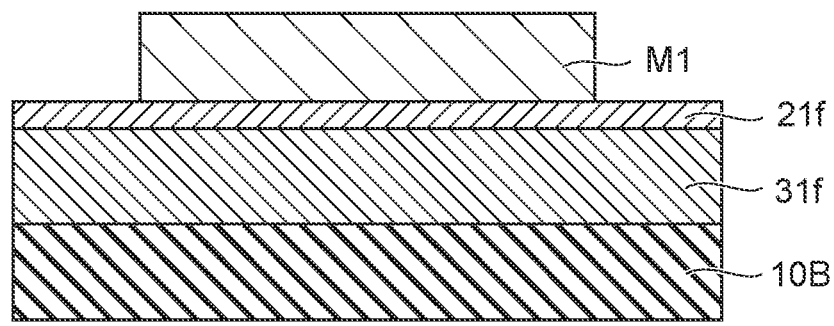

As shown in FIG. 6B, a mask member M1 is formed on the film 21f. The mask member M1 has an intended pattern shape. Using mask member M1 as a mask, parts of the film 31f and the film 21f are removed. Parts of these films can be removed by wet etching or dry etching, for example.

Figure 6C:
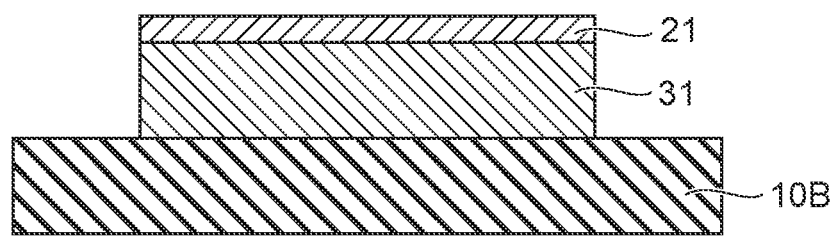

As shown in FIG. 6C, the mask member M1 is removed. The first layer 31 and the first intermediate layer 21 are obtained.

Figure 7A:
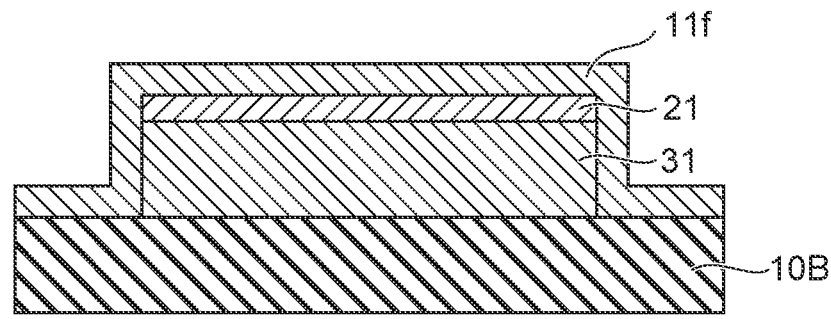
FIGS. 7A to 7C are schematic cross-sectional views illustrating the method for manufacturing the sensor according to the first embodiment.

As shown in FIG. 7A, a film 11f to be the first film 11 is formed on a processed body. The film 11f is formed by, for example, sputtering.

Figure 7B:
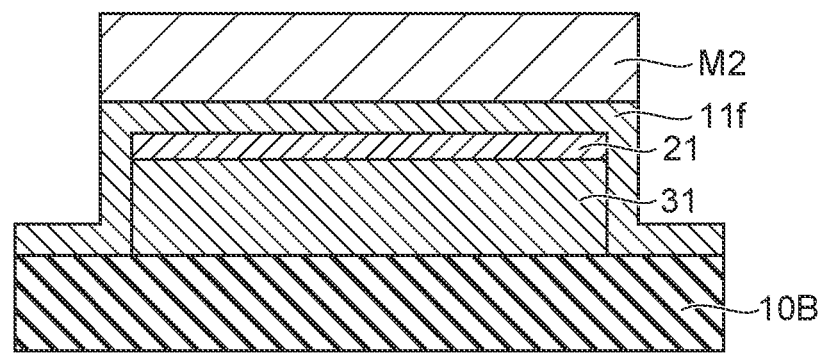

As shown in FIG. 7B, a mask member M2 is formed on the film 11f. The mask member M2 has an intended pattern shape. A part of the film 11f is removed using the mask member M2 as a mask. Removal of a part of the film 11f can be performed by wet etching or dry etching, for example.

Figure 7C:
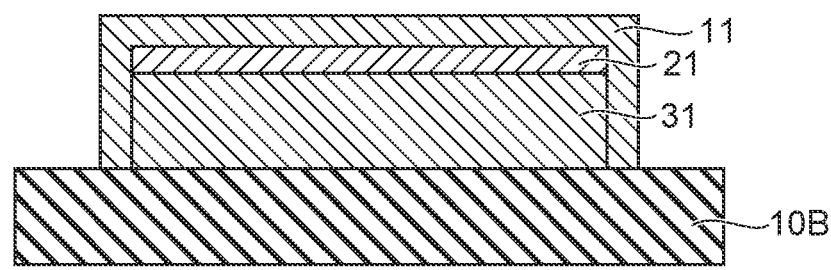

As shown in FIG. 7C, the mask member M2 is removed. The first film 11 is obtained. The sensor 112 is thus obtained.

Figure 8:
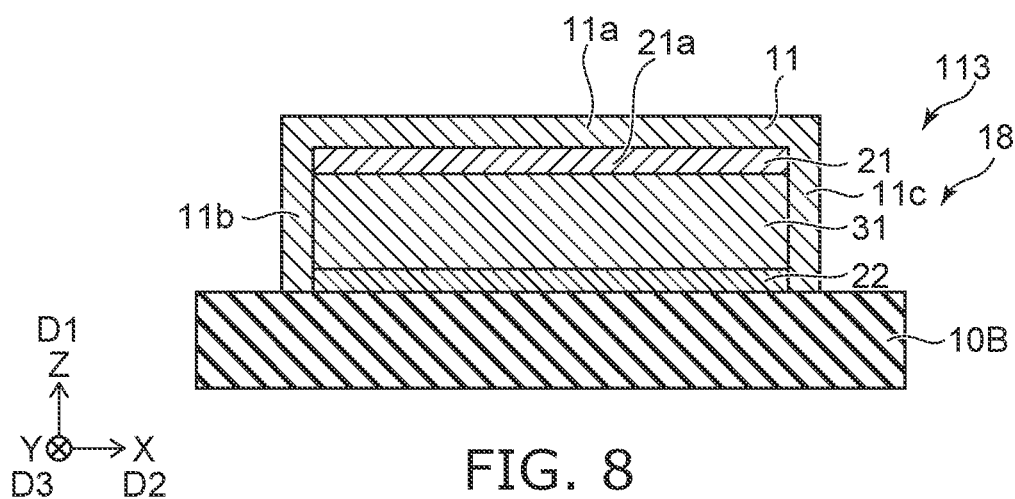
FIG. 8 is a schematic cross-sectional view illustrating a sensor according to the first embodiment.

FIG. 8 is a schematic cross-sectional view illustrating a sensor according to the first embodiment.

As shown in FIG. 8, in a sensor 113 according to the embodiment, the structure 18 further includes the second intermediate layer 22. Except for this, the configuration of the sensor 113 may be the same as that of the sensor 112.

Figure 9A:
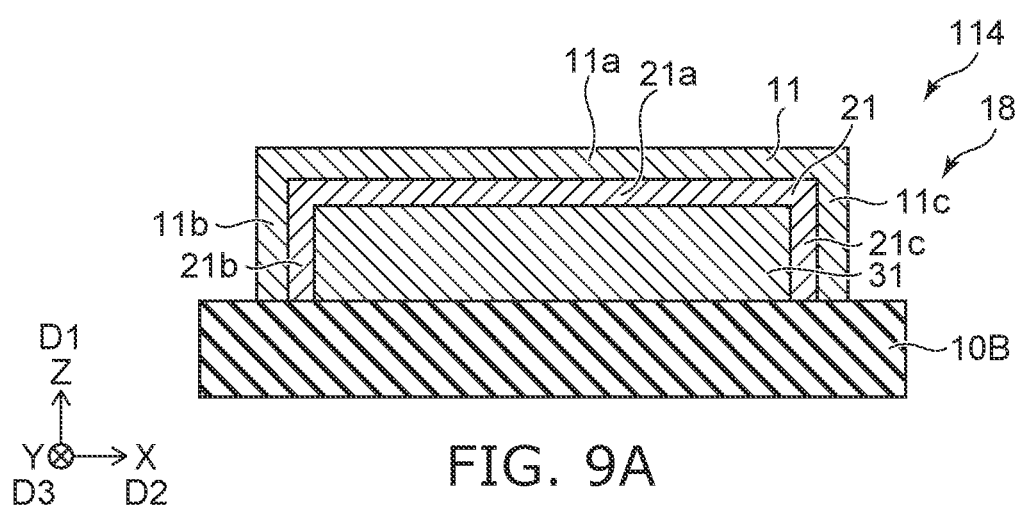
FIGS. 9A and 9B are schematic cross-sectional views illustrating a sensor according to the first embodiment.
Figure 9B:
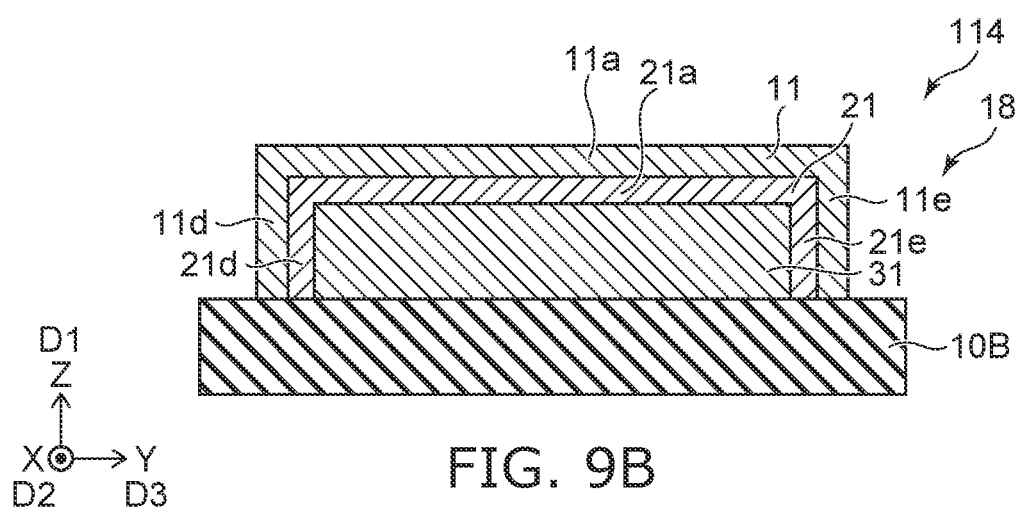

FIGS. 9A and 9B are schematic cross-sectional views illustrating a sensor according to the first embodiment.

As shown in FIG. 9A, in a sensor 114 according to the embodiment, the first intermediate layer 21 further includes a second partial region 21b and a third partial region 21c.

Except for this, the configuration of the sensor 114 may be the same as that of the sensor 112.

The second partial region 21b is between the second film region 11b and the first layer 31 in the second direction D2. In the second direction D2, the third partial region 21c is between the first layer 31 and the third film region 11c.

In the sensor 114, the influence of water on the side surface of the first layer 31 can be effectively suppressed by the second partial region 21b and the third partial region 21c. More stable detection becomes possible. Higher sensitivity is obtained.

As shown in FIG. 9A, the first partial region 21a may be continuous with the second partial region 21b and the third partial region 21c.

The second partial region 21b and the third partial region 21c are preferably in contact with the base layer 10B. The first layer 31 is more effectively protected by the second partial region 21b and the third partial region 21c.

In the sensor 114, the first layer 31 may be provided between portions of the first intermediate layer 21 in two directions crossing the first direction D1. For example, the first intermediate layer 21 covers the first layer 31.

As shown in FIG. 9B, in the sensor 114 according to the embodiment, the first intermediate layer 21 may further include a fourth partial region 21d and a fifth partial region 21e.

The fourth partial region 21d is between the fourth film region 11d and the first layer 31 in the third direction D3. In the third direction D3, the fifth partial region 21e is between the first layer 31 and the fifth film region 11e.

For example, the first partial region 21a is continuous with the fourth partial region 21d and the fifth partial region 21e. The second partial region 21b is continuous with the fourth partial region 21d and the fifth partial region 21e. The third partial region 21c is continuous with the fourth partial region 21d and the fifth partial region 21e. For example, the fourth partial region 21d and the fifth partial region 21e are in contact with the base layer 10B.

FIGS. 10A to 10C, FIGS. 11A to 11C, FIGS. 12A and 12B are schematic cross-sectional views illustrating a method for manufacturing the sensor according to the first embodiment.

Figure 10A:
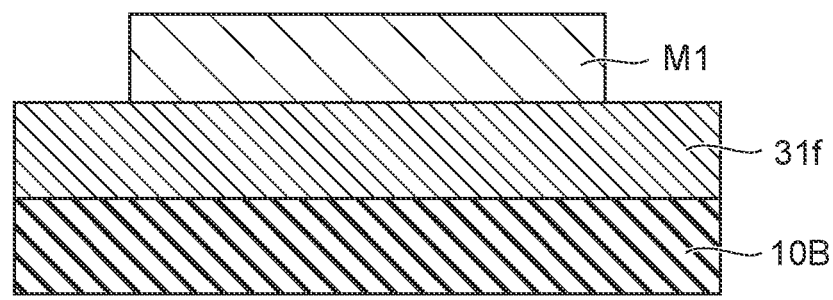
FIGS. 10A to 10C are schematic cross-sectional views illustrating a method for manufacturing the sensor according to the first embodiment.

As shown in FIG. 10A, the film 31f to be the first layer 31 is formed on the base layer 10B. The film 31f is formed by sputtering, for example. Furthermore, the mask member M1 is formed on the film 31f. The mask member M1 has an intended pattern shape.

Figure 10B:
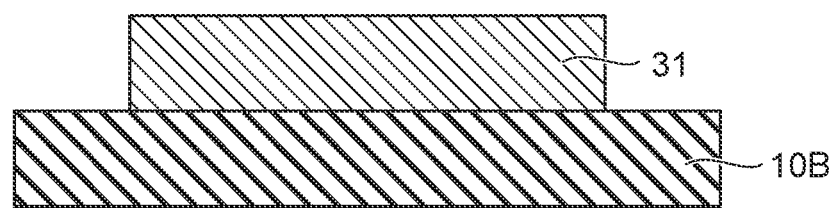

As shown in FIG. 10B, the first layer 31 is obtained by partially removing the film 31f using the mask member M1 as a mask. Removal of a part of the film 31f can be performed by wet etching or dry etching, for example. The mask member M1 is removed.

Figure 10C:
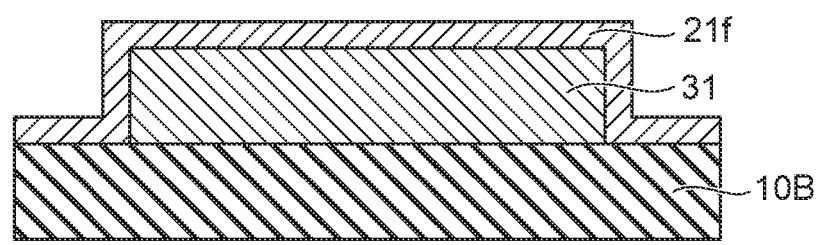

As shown in FIG. 10C, the film 21f to be the first intermediate layer 21 is formed on the processed body (the base layer 10B and the first layer 31). The film 21f is formed by, for example, sputtering.

Figure 11A:
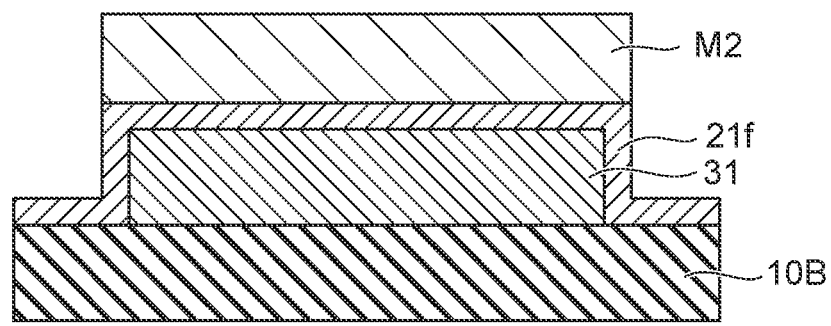
FIGS. 11A to 11C are schematic cross-sectional views illustrating the method for manufacturing the sensor according to the first embodiment.

As shown in FIG. 11A, the mask member M2 is formed on the film 21f. The mask member M2 has an intended pattern shape.

Figure 11B:
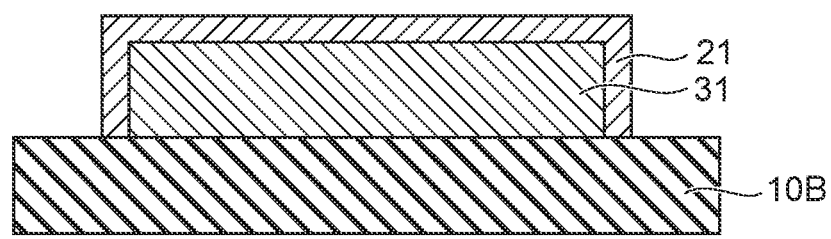

As shown in FIG. 11B, a part of the film 21f is removed using the mask member M2 as a mask. Removal of the part of the film 21f can be performed by wet etching or dry etching, for example. Thereby, the first intermediate layer 21 is obtained. The mask member M2 is removed.

Figure 11C:
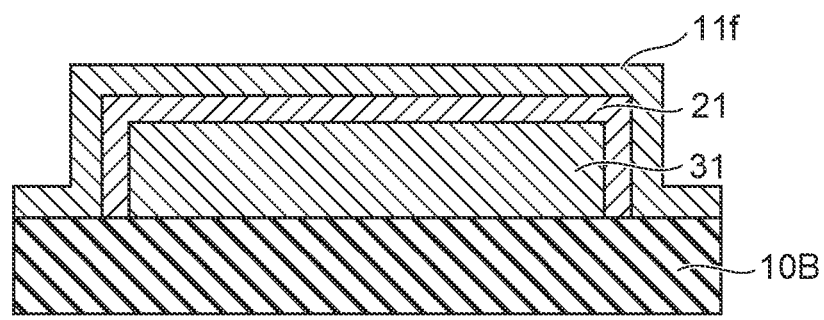

As shown in FIG. 11C, the film 11f to be the first film 11 is formed on the processed body (the base layer 10B, the first layer 31 and the first intermediate layer 21). The film 11f is formed by, for example, sputtering.

Figure 12A:
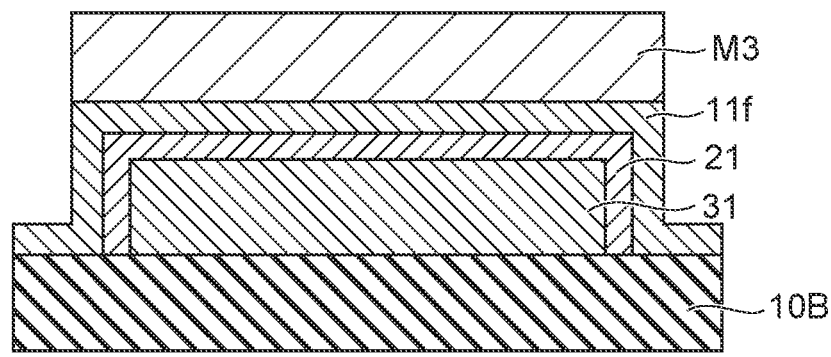
FIGS. 12A and 12B are schematic cross-sectional views illustrating the method for manufacturing the sensor according to the first embodiment.

As shown in FIG. 12A, a mask member M3 is formed on the film 11f. The mask member M3 has an intended pattern shape. A part of the film 11f is removed using the mask member M3 as a mask. Removal of the part of the film 11f can be performed by wet etching or dry etching, for example.

Figure 12B:
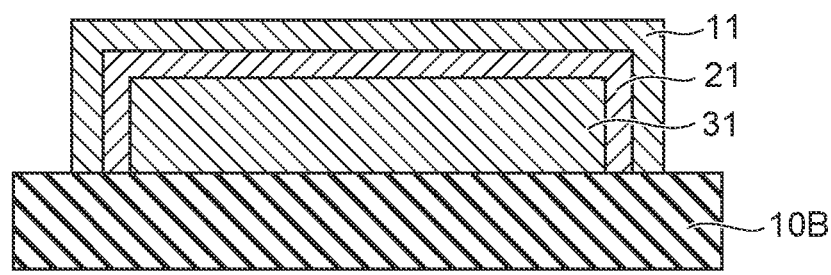

As shown in FIG. 12B, the mask member M3 is removed. The first film 11 is obtained. The sensor 114 is thus obtained.

Figure 13:
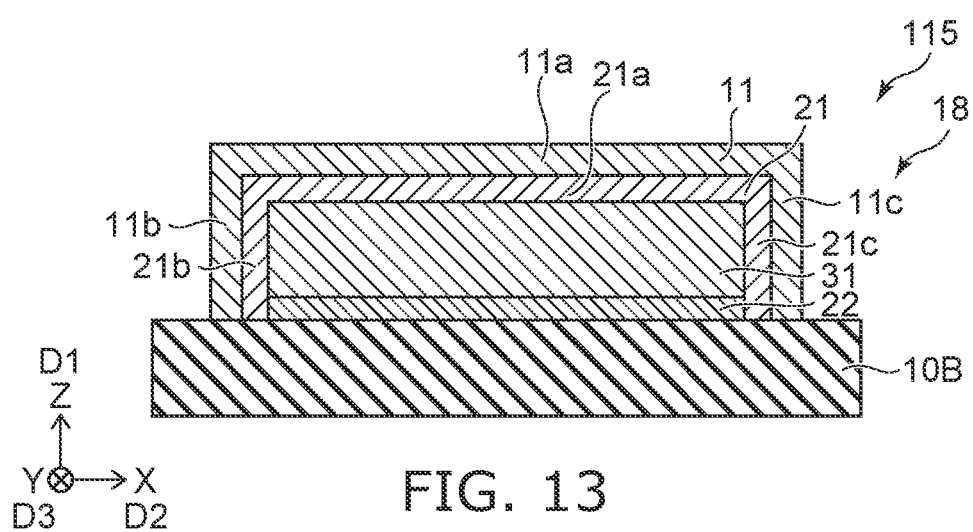
FIG. 13 is a schematic cross-sectional view illustrating a sensor according to the first embodiment.

FIG. 13 is a schematic cross-sectional view illustrating a sensor according to the first embodiment.

As shown in FIG. 13, in a sensor 115 according to the embodiment, the structure 18 further includes the second intermediate layer 22. Except for this, the configuration of the sensor 115 may be the same as that of the sensor 114.

Second Embodiment

Figure 14:
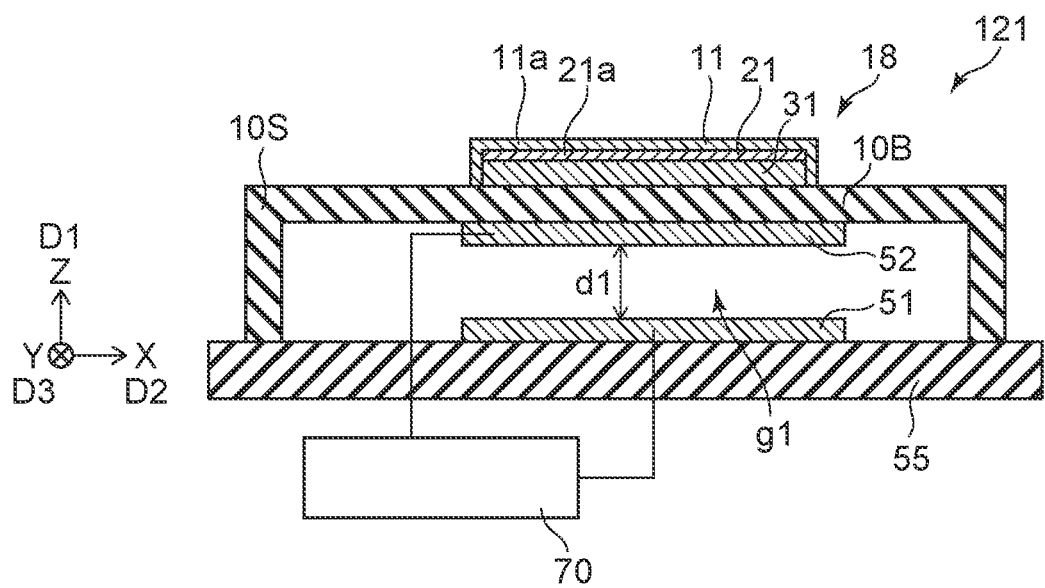
FIG. 14 is a schematic cross-sectional view illustrating a sensor according to a second embodiment.

FIG. 14 is a schematic cross-sectional view illustrating a sensor according to a second embodiment.

As shown in FIG. 14, a sensor 121 according to the embodiment includes a base 55, a first electrode 51 and a support part 10S. The sensor 121 also includes the structure 18 described with respect to the first embodiment. As already described, the structure 18 includes the first layer 31, the first film 11 and the first intermediate layer 21. The first film 11 includes a first film region 11a. The first intermediate layer 21 includes a first partial region 21a.

The first electrode 51 is fixed to the base 55. The support part 10S is fixed to the base 55 and supports the structure 18. The first electrode 51 is between the base 55 and the structure 18. A first gap g1 is provided between the first electrode 51 and the structure 18.

In the sensor 121, a distance d1 between the first electrode 51 and the structure 18 can be changed depending on the detection target. For example, the structure 18 changes according to the concentration of the detection target. This changes the distance d1.

For example, a conductive member included in the structure 18 may function as a counter electrode. A capacitance between the first electrode 51 and the conductive member (counter electrode) is detected. Thereby, a change in the distance d1 may be detected.

In this example, the structure 18 further includes a second electrode 52. The first gap g1 is provided between the first electrode 51 and the second electrode 52. The capacitance between the first electrode 51 and the second electrode 52 can be changed depending on the detection target.

In this example, a circuit part 70 is provided. The circuit part 70 is electrically connected to the first electrode 51 and the counter electrode (for example, the second electrode 52). The circuit part 70 can detect a value corresponding to a change in capacitance between the first electrode 51 and the counter electrode (for example, the second electrode 52). The sensor 121 is, for example, a variable capacitance gas sensor.

Third Embodiment

Figure 15:
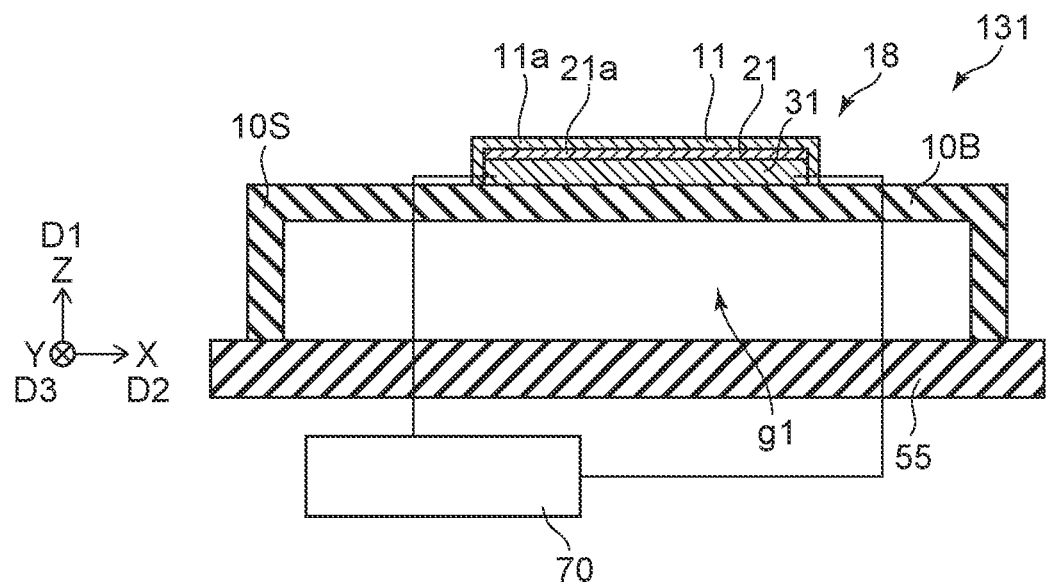
FIG. 15 is a schematic cross-sectional view illustrating a sensor according to a third embodiment.

FIG. 15 is a schematic cross-sectional view illustrating a sensor according to a third embodiment.

As shown in FIG. 15, a sensor 131 according to the embodiment includes the base 55 and the support part 10S. The sensor 131 also includes the structure 18 described with respect to the first embodiment. The support part 10S is fixed to the base 55 and supports the structure 18. The sensor 131 detects the electrical resistance of the first layer 31 due to the detection target. For example, the sensor 131 may include the circuit part 70. The circuit part 70 can detect a value corresponding to the electrical resistance of the first layer 31.

The first gap g1 may be provided between the base 55 and the structure 18 in the sensor 131. For example, the influence of the temperature of the base 55 is suppressed. Detection with higher accuracy becomes possible.

Embodiments may include the following configurations (for example, technical proposals).

Configuration 1
A sensor, comprising:
a structure,
the structure including
a first layer;
a first film including a first film region; and
a first intermediate layer including a first partial region,
the first partial region being between the first layer and the first film region,
a volume of the first layer being changeable depending on a detection target around the structure,
the first film including silicon and oxygen, and
the first intermediate layer including at least one selected from the group consisting of Pd, Pt and Ti.

Configuration 2
The sensor according to Configuration 1, wherein
the first layer includes Pd, Cu, and Si.

Configuration 3
The sensor according to Configuration 1 or 2, wherein
at least a part of the first layer is amorphous.

Configuration 4
The sensor according to any one of Configurations 1 to 3, wherein
the detection target includes hydrogen.

Configuration 5
The sensor according to any one of Configurations 1 to 4, wherein
the first film includes $SiO_x$ ($1 \leq x \leq 2$).

Configuration 6
The sensor according to any one of Configurations 1 to 5, wherein
the structure further includes a base layer, and
the first layer is between the base layer and the first film region.

Configuration 7
The sensor according to any one of Configurations 1 to 6, wherein
the base layer includes at least one selected from the group consisting of silicon, aluminum, and titanium, and at least one selected from the group consisting of oxygen and nitrogen.

Configuration 8
The sensor according to Configuration 6 or 7, wherein
the structure further includes a second intermediate layer,
the second intermediate layer is between the base layer and the first layer, and
the second intermediate layer includes at least one selected from the group consisting of Pd, Pt, and titanium.

Configuration 9
The sensor according to any one of Configurations 6 to 8, wherein
the first film further includes a second film region and a third film region, and
in a second direction crossing a first direction from the first layer to the first film region, the first layer is between the second film region and the third film region.

Configuration 10
The sensor according to Configuration 9, wherein
the first film region is continuous with the second film region and the third film region.

Configuration 11
The sensor according to Configuration 9 or 10, wherein
the second film region and the third film region are in contact with the base layer.

Configuration 12
The sensor according to any one of Configurations 9 to 11, wherein
the first intermediate layer further include a second partial region and a third partial region,
in the second direction, the second partial region is between the second film region and the first layer, and
in the second direction, the third partial region is between the first layer and the third film region.

Configuration 13
The sensor according to Configuration 12, wherein
the first partial region is continuous with the second partial region and the third partial region.

Configuration 14
The sensor according to Configuration 12 or 13, wherein
the second partial region and the third partial region are in contact with the base layer.

Configuration 15
The sensor according to any one of Configurations 1 to 14, further comprising:
a base;
a first electrode fixed to the base; and
a support part fixed to the base and supporting the structure,
the first electrode being between the base and the structure, and
a first gap being provided between the first electrode and the structure.

Configuration 16
The sensor according to Configuration 15, wherein
the structure further includes a second electrode, and
a first gap is provided between the first electrode and the second electrode.

Configuration 17
The sensor according to Configuration 16, wherein
capacitance between the first electrode and the second electrode can be changed depending on the detection target.

Configuration 18
The sensor according to Configuration 17, further comprising:
a circuit part configured to detect a value corresponding to the capacitance.

Configuration 19
The sensor according to any one of Configurations 15 to 18, wherein
a distance between the first electrode and the structure can be changed depending on the detection target.

Configuration 20
The sensor according to any one of Configurations 1 to 14, further comprising:
a base; and
a support part fixed to the base and supporting the structure.

Configuration 21
A sensor, comprising:
a structure including
a first layer,
a first film including a first film region, and
a first intermediate layer including a first partial region, the first partial region being between the first layer and the first film region, a volume of the first layer being changeable depending on a detection target around the structure, the first film including aluminum and oxygen, and the first intermediate layer including at least one selected from the group consisting of Pd, Pt and Ti.

Configuration 22

A sensor, comprising:

a structure including a first layer, a first film including a first film region, and a first intermediate layer including a first partial region, the first partial region being between the first layer and the first film region, an electrical resistance of the first layer being changeable depending on a detection target around the structure, the first film including silicon and oxygen, and the first intermediate layer including at least one selected from the group consisting of Pd, Pt and Ti.

Configuration 23

The sensor according to Configuration 22, further comprising:

a circuit part configured to detect a value corresponding to the electrical resistance.

Configuration 24

The sensor according to any one of Configurations 21 to 23, wherein the first film further includes a second film region and a third film region, and in a second direction crossing a first direction from the first layer to the first film region, the first layer is between the second film region and the third film region.

Configuration 25

The sensor according to any one of Configurations 21 to 23, wherein the structure further includes a base layer, and the first layer is between the base layer and the first film region.

Configuration 26

The sensor according to Configuration 25, wherein the structure further includes a second intermediate layer, the second intermediate layer is between the base layer and the first layer, and the second intermediate layer includes at least one selected from the group consisting of Pd, Pt, and Ti.

Fourth Embodiment

Figure 16A:
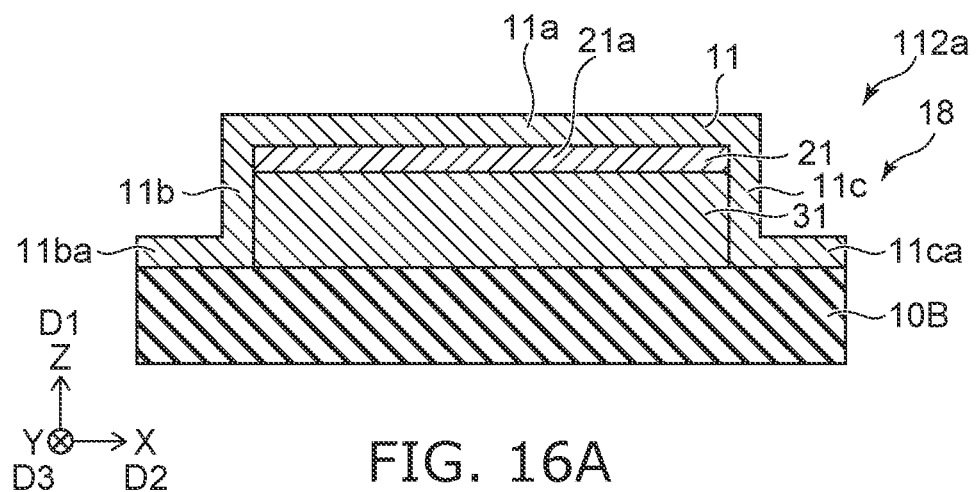
FIGS. 16A and 16B are schematic cross-sectional views illustrating a sensor according to a fourth embodiment.
Figure 16B:
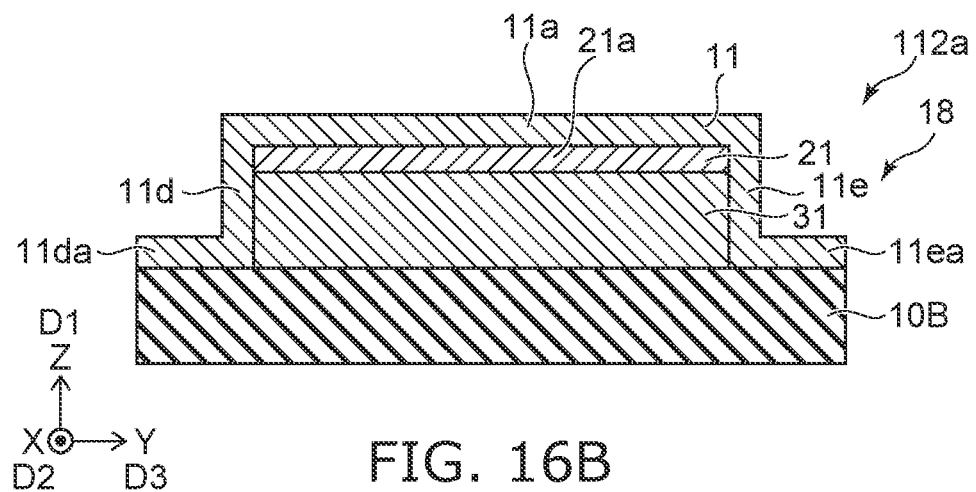

FIGS. 16A and 16B are schematic cross-sectional views illustrating a sensor according to the fourth embodiment.

As shown in FIGS. 16A and 16B, in a sensor 112a according to the embodiment, the first film 11 further includes a second extension region 11ba, a third extension region 11ca, a fourth extension region 11da, and a fifth extension region 11ea. Except for this, the configuration of the sensor 112a may be the same as that of the sensor 112.

The second extension region 11ba is continuous with the second film region 11b. The second extension region 11ba extends along the base layer 10B. The third extension region 11ca is continuous with the third film region 11c. The third extension region 11ca extends along the base layer 10B. For example, the second extension region 11ba and the third extension region 11ca are in contact with the base layer 10B.

The fourth extension region 11da is continuous with the fourth film region 11d. The fourth extension region 11da extends along the base layer 10B. The fifth extension region 11ea is continuous with the fifth film region 11e. The fifth extension region 11ea extends along the base layer 10B. For example, the fourth extension region 11da and the fifth extension region 11ea are in contact with the base layer 10B.

In the sensor 112a, the influence of oxygen can be effectively suppressed in the region between the side surface of the first layer 31 and the base layer 10B by the second film region 11b and the third film region 11c. More stable detection becomes possible. Higher sensitivity is obtained.

Figure 17A:
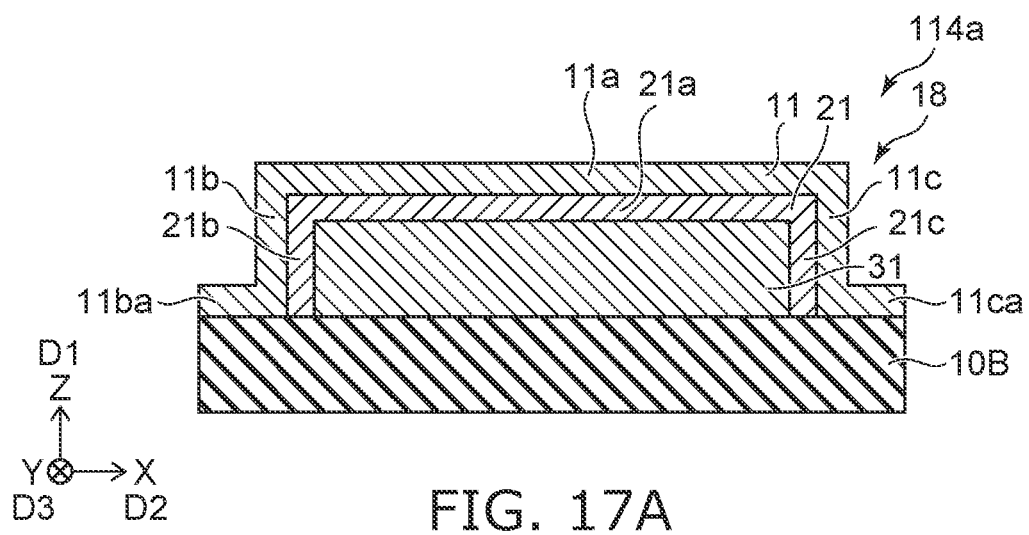
FIGS. 17A and 17B are schematic cross-sectional views illustrating a sensor according to the fourth embodiment.
Figure 17B:
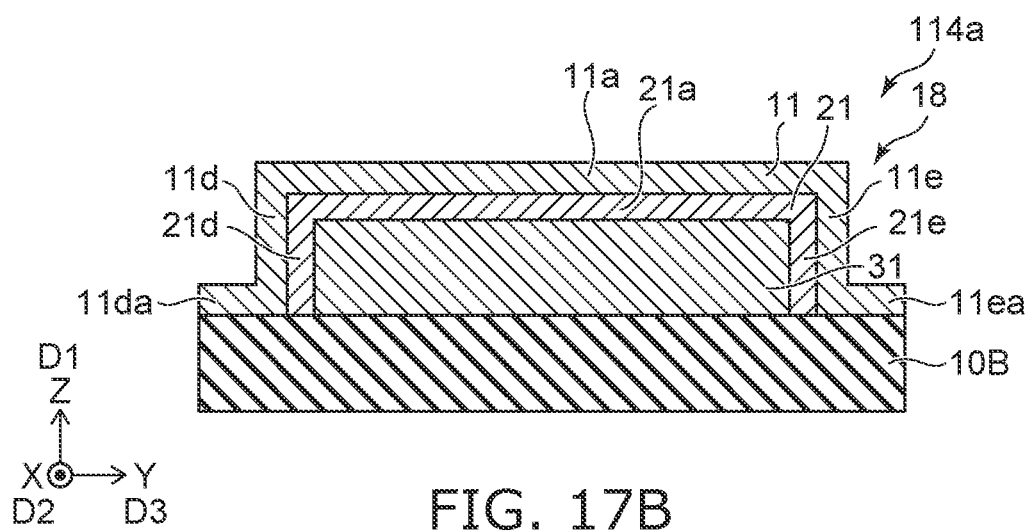

FIGS. 17A and 17B are schematic cross-sectional views illustrating a sensor according to the fourth embodiment.

As shown in FIGS. 17A and 17B, in a sensor 114a according to the embodiment, the first film 11 further includes the second extension region 11ba, the third extension region 11ca, the fourth extension region 11da, and the fifth extension region ilea. Except for this, the configuration of the sensor 114a may be the same as that of the sensor 114. In the sensor 114a, the influence of oxygen can be effectively suppressed. More stable detection becomes possible. Higher sensitivity is obtained.

Figure 18:
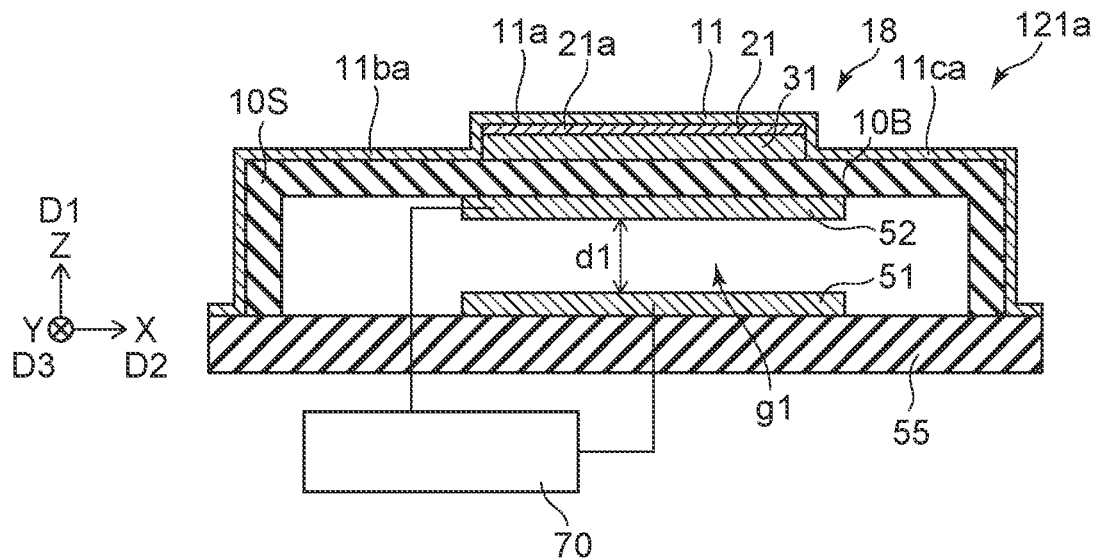
FIG. 18 is a schematic cross-sectional view illustrating a sensor according to the fourth embodiment.

FIG. 18 is a schematic cross-sectional view illustrating a sensor according to the fourth embodiment.

As shown in FIG. 18, in a sensor 121a according to the embodiment, the first film 11 includes the second extension region 11ba and the third extension region 11ca. The fourth extension region 11da and the fifth extension region 11ea may be provided in the sensor 121a (see FIGS. 16A and 16B). Except for this, the configuration of the sensor 121a may be the same as that of the sensor 121. In the sensor 121a, the influence of oxygen can be effectively suppressed. More stable detection becomes possible. Higher sensitivity is obtained.

Figure 19:
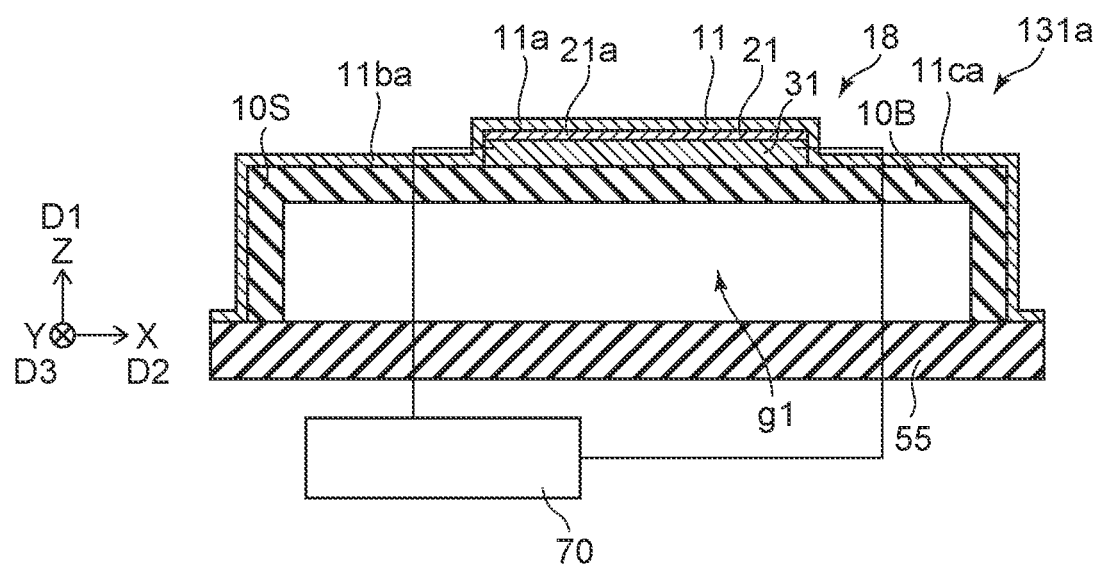
FIG. 19 is a schematic cross-sectional view illustrating a sensor according to the fourth embodiment.

FIG. 19 is a schematic cross-sectional view illustrating a sensor according to the fourth embodiment.

As shown in FIG. 19, in a sensor 131a according to the embodiment, the first film 11 includes the second extension region 11ba and the third extension region 11ca. The fourth extension region 11da and the fifth extension region 11ea may be provided in the sensor 131a (see FIGS. 16A and 16B). Except for this, the configuration of the sensor 131a may be the same as that of the sensor 131. In the sensor 131a, the influence of oxygen can be effectively suppressed. More stable detection becomes possible. Higher sensitivity is obtained.

According to the embodiments, a sensor capable of stable detection can be provided.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as structures, layers, films, circuit parts, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors practicable by an appropriate design modification by one skilled in the art based on the sensors described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
a structure,
the structure including
a base layer including at least one selected from the group consisting of silicon, aluminum, and titanium, and at least one selected from the group consisting of oxygen and nitrogen;
a first layer;
a first film including a first film region; and
a first intermediate layer including a first partial region,
the first partial region being between the first layer and the first film region,
a volume of the first layer being changeable depending on a detection target around the structure,
the first film including silicon and oxygen, and
the first intermediate layer including at least one selected from the group consisting of Pd, Pt and Ti.

2. The sensor according to claim 1, wherein the first layer includes Pd, Cu, and Si.

3. The sensor according to claim 1, wherein at least a part of the first layer is amorphous.

4. The sensor according to claim 1, wherein the detection target includes hydrogen.

5. The sensor according to claim 1, wherein the first film includes SiOx (1≤x≤2).

6. The sensor according to claim 1, wherein the first layer is between the base layer and the first film region.

7. The sensor according to claim 6, wherein the structure further includes a second intermediate layer, the second intermediate layer is between the base layer and the first layer, and
the second intermediate layer includes at least one selected from the group consisting of Pd, Pt, and Ti.

8. The sensor according to claim 6, wherein the first film further includes a second film region and a third film region, and
in a second direction crossing a first direction from the first layer to the first film region, the first layer is between the second film region and the third film region.

9. The sensor according to claim 8, wherein the first film region is continuous with the second film region and the third film region.

10. The sensor according to claim 8, wherein the second film region and the third film region are in contact with the base layer.

11. The sensor according to claim 8, wherein the first intermediate layer further include a second partial region and a third partial region,
in the second direction, the second partial region is between the second film region and the first layer, and
in the second direction, the third partial region is between the first layer and the third film region.

12. The sensor according to claim 11, wherein the first partial region is continuous with the second partial region and the third partial region.

13. The sensor according to claim 11, wherein the second partial region and the third partial region are in contact with the base layer.

14. The sensor according to claim 1, further comprising:
a base;
a first electrode fixed to the base; and
a support part fixed to the base and supporting the structure,
the first electrode being between the base and the structure, and
a first gap being provided between the first electrode and the structure.

15. The sensor according to claim 14, wherein the structure further includes a second electrode, and
the first gap is provided between the first electrode and the second electrode.

16. The sensor according to claim 15, wherein capacitance between the first electrode and the second electrode can be changed depending on the detection target.

17. A sensor, comprising:
a structure including
a first layer,
a first film including a first film region, and
a first intermediate layer including a first partial region,
the first partial region being between the first layer and the first film region,
a volume of the first layer being changeable depending on a detection target around the structure,
the first film including aluminum and oxygen, and
the first intermediate layer including at least one selected from the group consisting of Pd, Pt and Ti.

18. The sensor according to claim 17, wherein the first film further includes a second film region and a third film region, and
in a second direction crossing a first direction from the first layer to the first film region, the first layer is between the second film region and the third film region.

19. A sensor, comprising:
a structure,
the structure including
a base layer;
a first film including a first film region, the first film including silicon and oxygen;
a first layer between the base layer and the first film region;
a first intermediate layer including a first partial region, the first intermediate layer including at least one selected from the group consisting of Pd, Pt and Ti, the first partial region being between the first layer and the first film region; and
a second intermediate layer between the base layer and the first layer, the second intermediate layer including at least one selected from the group consisting of Pd, Pt, and Ti,
a volume of the first layer being changeable depending on a detection target around the structure.

* * * * *